United States Patent
Lichter et al.

(10) Patent No.: US 8,929,178 B2
(45) Date of Patent: Jan. 6, 2015

(54) SONAR DATA COLLECTION SYSTEM

(75) Inventors: Harry J. Lichter, Palm Beach Gardens, FL (US); Brian S. Tilton, Jupiter, FL (US); Samuel Garcia, Palm Beach Gardens, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 490 days.

(21) Appl. No.: 13/280,490

(22) Filed: Oct. 25, 2011

(65) Prior Publication Data
US 2012/0099399 A1 Apr. 26, 2012

Related U.S. Application Data

(60) Provisional application No. 61/406,309, filed on Oct. 25, 2010.

(51) Int. Cl.
*G01S 15/00* (2006.01)
*G01S 15/89* (2006.01)
*G01S 15/88* (2006.01)
*G01S 7/521* (2006.01)
*G01S 15/87* (2006.01)
*G01S 15/02* (2006.01)

(52) U.S. Cl.
CPC ............... *G01S 15/88* (2013.01); *G01S 15/89* (2013.01); *G01S 7/521* (2013.01); *G01S 15/87* (2013.01); *G01S 15/025* (2013.01)
USPC ............................................ 367/173; 367/93

(58) Field of Classification Search
USPC .................................................. 367/93, 173
See application file for complete search history.

(56) References Cited

U.S. PATENT DOCUMENTS

| 5,142,502 | A | | 8/1992 | Wilcox et al. | |
|---|---|---|---|---|---|
| 5,200,931 | A | * | 4/1993 | Kosalos et al. | 367/88 |

(Continued)

FOREIGN PATENT DOCUMENTS

CN 101070092 11/2007

OTHER PUBLICATIONS

JC Evans, JS Smith and KM Keller, C21"Docking Techniques and Evaluation Trials of the Swimmer AUV", Proceedings of IFAC Conference Control Applications in Marine Systems (CAMS 2001), Glasgow, Scotland, Jul. 2001.

(Continued)

*Primary Examiner* — Isam Alsomiri
*Assistant Examiner* — James Hulka
(74) *Attorney, Agent, or Firm* — Hamre, Schumann, Mueller & Larson, P.C.

(57) ABSTRACT

A system that can be used for inspecting underwater structures. The system allows a user to gain a better understanding of the condition of an underwater structure. The system is a self-contained, modular system that can be operated by divers, coupled to an AUV, ROV or other host platform vehicle deployment platform, towed by a ship, pole mounted, or hull mounted. All of the components necessary to achieve the desired scanning functions are incorporated onto the self-contained, modular system. The system can include and fully utilize a 3D sonar system and an inertial navigation system. This combination of features permits the system to be used to, for example, generate 3D models of underwater structures, detect changes in underwater structures by comparing the generated 3D model against an a priori 3D model, and provide navigational updates to the host platform based on the observed features of an underwater structure.

25 Claims, 6 Drawing Sheets

(56) References Cited

U.S. PATENT DOCUMENTS

| | | | |
|---|---|---|---|
| 6,317,387 B1 | 11/2001 | D'Amaddio et al. | |
| 6,449,215 B1* | 9/2002 | Shell | 367/7 |
| 6,707,761 B2* | 3/2004 | Erikson | 367/131 |
| 2002/0071345 A1* | 6/2002 | Chiang et al. | 367/138 |
| 2003/0058738 A1* | 3/2003 | Erikson | 367/7 |
| 2003/0167998 A1* | 9/2003 | Huntsman | 114/312 |
| 2005/0265123 A1 | 12/2005 | Pope | |
| 2006/0235583 A1* | 10/2006 | Larsen | 701/21 |
| 2007/0025185 A1* | 2/2007 | Green et al. | 367/124 |
| 2007/0159922 A1 | 7/2007 | Zimmerman et al. | |
| 2008/0264323 A1* | 10/2008 | Gosling | 114/330 |
| 2009/0031940 A1 | 2/2009 | Stone et al. | |
| 2009/0296527 A1 | 12/2009 | Cuschieri et al. | |
| 2010/0020927 A1* | 1/2010 | Gilevich et al. | 378/57 |
| 2012/0099395 A1 | 4/2012 | Debrunner et al. | |
| 2012/0099398 A1* | 4/2012 | Lichter et al. | 367/93 |
| 2012/0099400 A1 | 4/2012 | Debrunner et al. | |
| 2012/0099402 A1 | 4/2012 | Debrunner et al. | |
| 2012/0101715 A1 | 4/2012 | Tangirala et al. | |

OTHER PUBLICATIONS

Gwyn Griffiths et al., "Open Ocean Operational Experience with the Autosub-1 Autonomous Underwater Vehicle", Proceedings of UUST (Unmanned Untethered Submersible Technology) Conference, New Hampshire, 1998.

Evans, J.; Redmond, P.; Plakas, C.; Hamilton, K.; Lane, D, "Autonomous docking for Intervention-AUVs usng sonar and video-based real-time 3D pose estimation", OCEANS 2003. Proceedings, vol. 4, pp. 2201-2210 vol. 4, Sep. 22-26, 2003.

International Search Report for international application No. PCT/US2011/057604, dated Jan. 30, 2012 (5 pages).

Written Opinion of the International Searching Authority for international application No. PCT/US2011/057604, dated Jan. 30, 2012 (5 pages).

What We Do: IMR Services: Structural Inspections, Trico Marine Group, available online at http://web.archive.org/web/20100831085149/http://www.do.tricomarine.com/structural-inspections.php, dated Aug. 31, 2010, printed Mar. 30, 2012 (2 pages).

"Seaeye Lynx," available online at http://www.seaeye.com/lynx.html, printed Mar. 29, 2012 (7 pages).

Edoardo Bovio, "Autonomous Underwater Vehicles for Port Protection," NATO Undersea Research Centre, Technical Report #NURC-PR-2006-001, 2006 (10 pages).

Johan Carlström and Ingemar Nygren, "Terrain Navigation of the Swedish AUV62F Vehicle," International Symposium on Unmanned Untethered Submersible Technology, 2005 (10 pages).

Deborah K. Meduna et al., "AUV Terrain Relative Navigation Using Coarse Maps," Proceedings of the 2009 Unmanned Untethered Submersible Technology Conference, located online at http://www.stanford.edu/group/arl/cgi-bin/drupal/sites/default/files/public/publications/MedunaRM%202009.pdf (11 pages).

Peter Kimball and Stephen Rock, "Sonar-Based Iceberg-Relative AUV Localization," UUST: Unmanned Untethered Submersible Technology Conference. 2009. located online at http://www.stanford.edu/group/arl/cgi-bin/drupal/sites/default/files/public/publications/KimballR%202009.pdf (9 pages).

"SAAB Seaeye Sabertooth: New AUV from SAAB Seaeye!" available online at http://www.rov-online.com/?p=290, Mar. 22, 2010 (1 page).

"Subsea 7 Announces First Autonomous Inspection Vehicle (AIV) to be Commercially Available in 2011," available online at http://www.seebyte.com/page/news/news/84/Subsea-7-Announces-First-Autonomous-Inspection-Vehicle-AIV-to-be-Commercially-Available-in-2011; May 13, 2010 (2 pages).

"Taking AUV Technology to the Next Level," Ocean News & Technology, available online at http://www.ocean-news.com/home/213-april-cover-story; Apr. 2010 (3 pages).

English translation of examination report from corresponding Chinese application No. 201180048447.0; issued Sep. 30, 2014; 6 pages.

N. Fairfield et al., "Real-Time SLAM with Octree Evidence Grids for Exploration in Underwater Tunnels," Journal of Field Robotics vol. 24, No. 1-2 (2007) p. 3-21.

Supplementary European Search Report for European application No. 11838502, dated Oct. 31, 2014 (9 pages).

* cited by examiner

SONAR DATA COLLECTION SYSTEM

This application claims the benefit of U.S. Provisional Applicant Ser. No. 61/406,309, filed on Oct. 25, 2010, the entire contents of which are incorporated by reference.

FIELD

This disclosure relates to a system for conducting inspections of subsea and other underwater structures.

BACKGROUND

There are a number of underwater structures for which one might need to gain a better understanding of the underwater structures. One example is the inspections of the subsea support structures of offshore oil and gas platforms that are conducted on a routine basis or after an extreme event such as a hurricane. Current methods of inspecting underwater structures include inspections using divers, remotely operated vehicles (ROVs) and autonomous underwater vehicles (AUVs).

SUMMARY

A system that can be used for inspecting underwater structures is described. The system allows a user to gain a better understanding of the condition of an underwater structure. The system is a self-contained, modular system that can be operated by divers, coupled to an AUV, ROV or other host vehicle deployment platform, towed by a ship, pole mounted, or hull mounted. All of the components necessary to achieve the desired scanning functions are incorporated onto the self-contained, modular system.

The system can be used to scan any type of underwater structure composed of material dissimilar enough from water to provide sonar reflections. Underwater structures include man-made objects such as offshore oil platform support structures and oil-well related equipment, as well as natural objects such as geological and biological formations. Scanning an underwater structure may be desirable, for example, to inspect the structure as part of a routine inspection schedule or after an extreme event such as a hurricane, or to generate a model of the underwater structure. As used herein, the term underwater includes any type of underwater environment in which an underwater structure may be located and may need to be scanned using the system described herein, including, but not limited to, salt-water locations such as seas and oceans, and freshwater locations.

The system can include and fully utilize a 3D sonar system and an inertial navigation system. This combination of features permits the system to be used to, for example, generate 3D models of underwater structures, detect changes in underwater structures by comparing the generated 3D model against an a priori 3D model, and provide navigational updates to the host platform based on the observed features of an underwater structure, although other uses of the system are possible.

In one embodiment, a modular system for use in scanning underwater structures includes a modular support frame, a 3D sonar system mounted on the modular support frame, an Inertial Navigation System (INS) mounted on the modular support frame, and an electronics pressure vessel mounted on the modular support frame. The INS can include a Doppler Velocity Log (DVL) and a Conductivity Temperature and Depth (CTD) sensor. The electronics pressure vessel can include one or more data processors, one or more non-volatile storage device, and other associated components required to operate the 3D Sonar, INS, CTD, and interface to the host platform, which optionally includes power and communication connections. The 3D sonar system, INS, and CTD are electrically connected to the electronics pressure vessel. Optionally a GPS system can also be connected to the electronics pressure vessel and mounted on the modular support frame. This modular system is self-contained and in one embodiment needs only to be connected to a host platform, such as an AUV or ROV, for electrical power and locomotion. The electrical power requirement can be alleviated through the use of optional submersible battery assemblies which can also be mounted on the modular support frame.

The modular system may also contain one or more additional sonar systems of different frequencies to collect different data about the structure being inspected. One example is to include a low frequency sonar system, such as the one described in U.S. Provisional Patent Application Ser. No. 61/406,479, filed on Oct. 25, 2010, and titled Remote Flooded Member Detection, which is incorporated herein by reference in its entirety, to inspect the structure for flooded members. This second sonar system would also be mounted on the modular support frame and would be electrically connected to the electronics pressure vessel.

The modular system may also contain one or more cameras and/or lights for use in collecting visual data of the structure being inspected. The cameras, if present, can be still and/or video, color and/or black and white, cameras. The lights, if present, can be flash/strobe and/or sustained lights. These cameras and lights would also be mounted on the modular support frame and electrically connected to the electronics pressure vessel.

As used herein, an ROV is a remotely operated underwater vehicle that is tethered to a host, such as a surface ship. The ROV is unoccupied and is operated by a pilot aboard the host. The tether can carry, for example, electrical power (in place of or to supplement battery power on the self-contained system), video and data signals back and forth between the host and the ROV.

As used herein, an AUV is an autonomous underwater vehicle that is unmanned and is not tethered to a host vessel.

DRAWINGS

DETAILED DESCRIPTION

Figure 1:
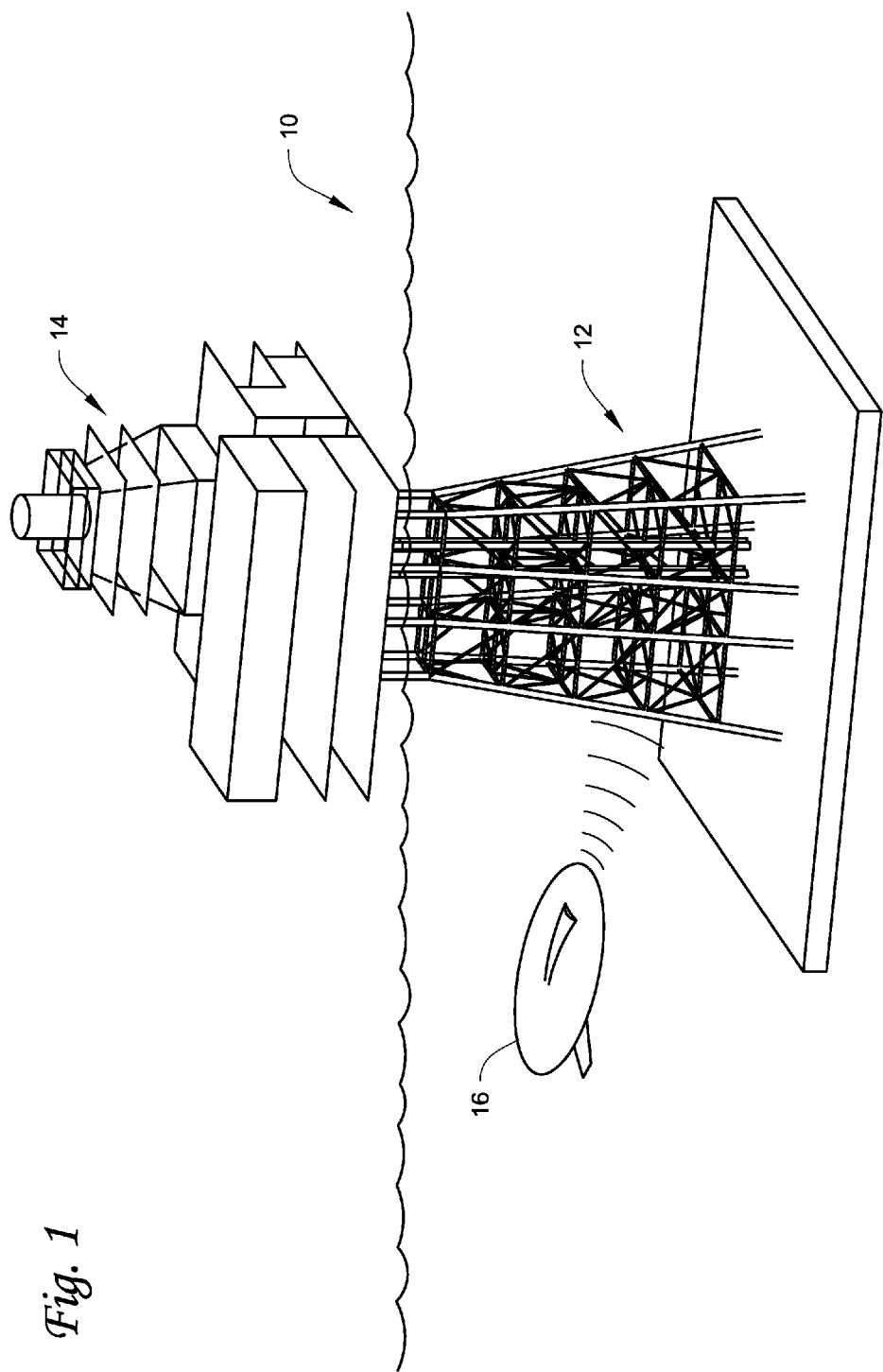
FIG. 1 depicts a system described herein scanning an underwater structure.

FIG. 1 illustrates a body of water 10 in which an underwater structure 12 is disposed. The body of water 10 can be any body of water, saltwater or freshwater. In this illustrated example, the structure 12 is a support structure of an oil platform 14, where the support structure 12 is mounted to the floor of the body of water. However, the depiction of an oil platform support structure is exemplary only, and it is to be understood that the underwater structure can be any type of underwater structure, man-made or naturally occurring, anchored to the floor or floating.

A system 16 is shown submerged in the water 10 and in position relative to the structure 12 for scanning the structure. The system 16 is illustrated in FIG. 1 as being incorporated into an AUV. However, as described in more detail below, the system 16 is not limited to operation as or with an AUV.

Figure 2:
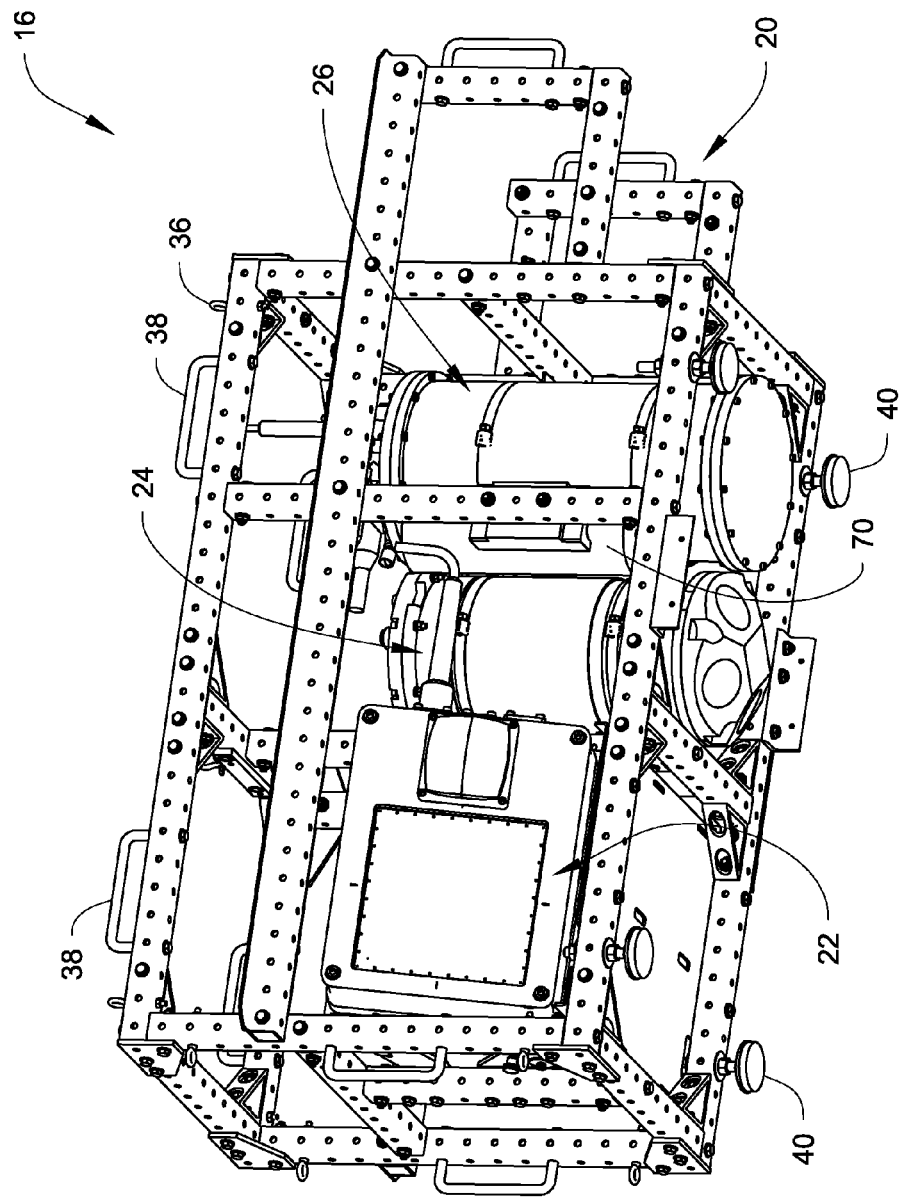
FIG. 2 is a perspective view of a modular scanning package that forms part of the system described herein.
Figure 3:
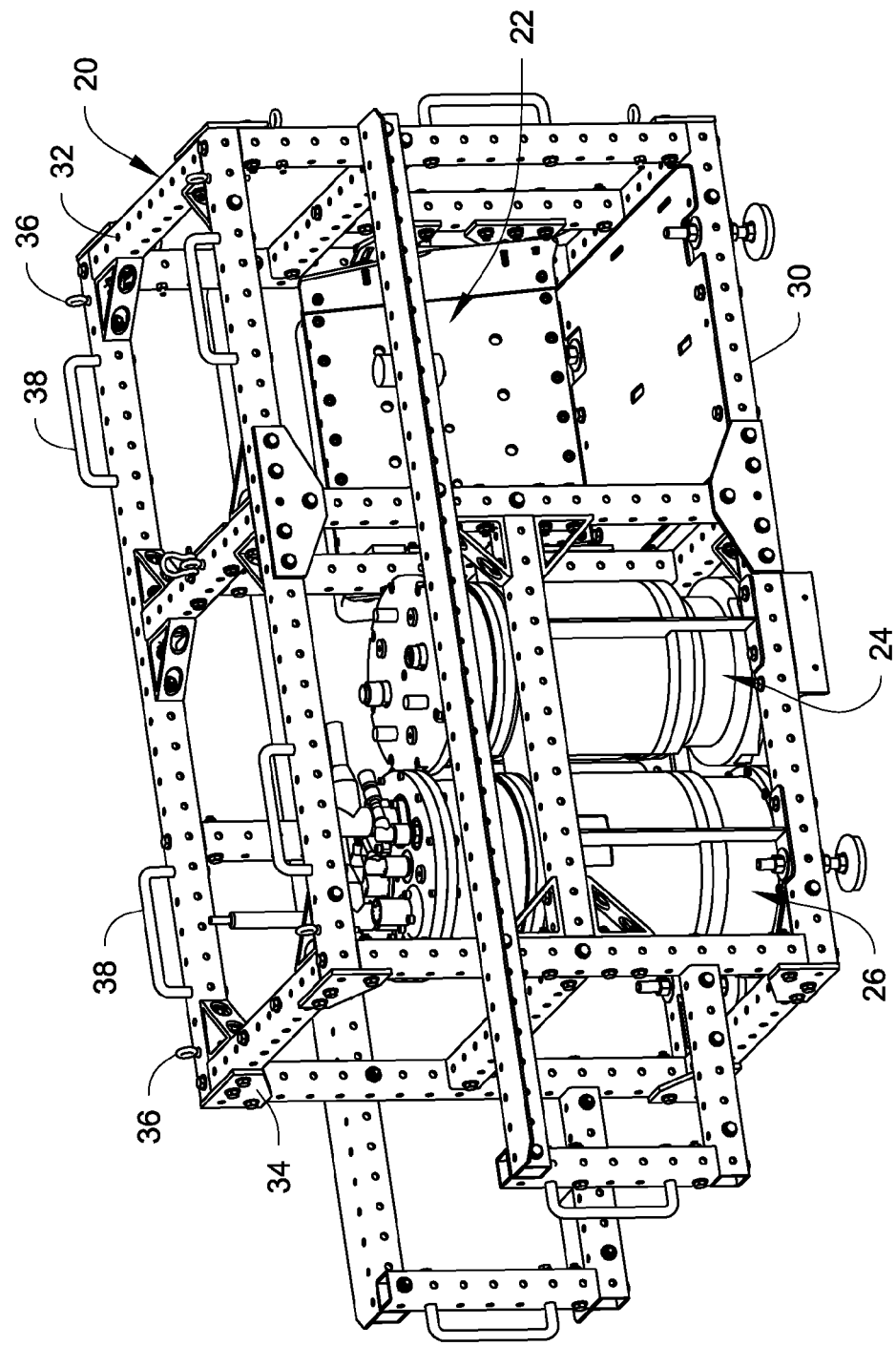
FIG. 3 is another perspective view of the modular scanning package.

FIGS. 2 and 3 illustrate the system 16 in the form of a modular package. The package forms the core of the system and includes a support structure 20, and a 3D sonar 22, an Inertial Navigation System (INS) 24 and an electronics pressure vessel 26 mounted on the support structure 20.

In the illustrated example, the support structure 20 is a modular support frame composed of a plurality of individual hollow frame member 30 made from a suitable material such as aluminum. Each frame member 30 is generally rectangular in shape, with a plurality of holes 32 along the frame members to facilitate assembly of the support frame, to facilitate changes in the shape of the support frame, and to facilitate mounting the support frame to a host platform if desired. Gusset plates 34 or other suitable connectors connect the frame members 30 to each other.

A plurality of optional eye-bolts 36 can be connected to support frame at suitable locations to facilitate attachment of lifting devices to the support frame for lifting the system. In addition, a plurality of optional handles 38 can be connected to frame members 30 at the top of the support frame, which can be to assist diver handling when the package is used in the diver operated version shown in FIG. 6. In addition, a plurality of optional adjustable feet 40 can be provided at the base of the support frame, which can be used for leveling the support frame while sitting on deck.

With continued reference to FIGS. 2 and 3, the 3D sonar 22 is mounted on the support structure 20. The 3D sonar 22 can be any sonar that creates a 3D image. An example of a suitable 3D sonar is the CodaOctopus Echoscope available from CodaOctopus Products. In the illustrated embodiment, the sonar 22 is mounted so that the sonar 22 points toward or out the side of the support structure so as to send pings out to the side. The sonar 22 is also oriented at a desired angle relative to vertical as evident from FIG. 2. For example, the sonar 22 can be tilted downward at an angle relative to vertical. However, it is to be understood that in appropriate circumstances, the sonar 22 could be mounted so as to point in other directions and have other orientations relative to vertical.

The 3D sonar 22 is electrically connected to the electronics pressure vessel 26 and to the data processing electronics and data storage devices therein, so that data produced by the sonar 22 as it sends out and receives returning pings are routed to the pressure vessel. In addition, the 3D sonar 22 receives power from the pressure vessel 26.

The INS 24 is also mounted on the support structure 20. The INS 24 determines the position, orientation, and velocity (direction and speed of movement) of the support structure 20. The INS 24 includes a Doppler Velocity Log (DVL) unit that faces downward for use in determining velocity. The INS 24 can be any system that can determine position, orientation, and velocity (direction and speed of movement). An example of a suitable INS is the Sea DeVil available from Kearfott Corporation.

A Conductivity, Temperature, Depth (CTD) sensor 70 for sensing salinity of the water, water temperature, and depth is also provided. The CTD sensor improves the operation of the 3D sonar 22 and the INS 24 by providing speed of sound information and a reference depth measurement. It is understood that any sensor providing this information can be substituted in place of the sensor 70, and that the system can be operated without the sensor CTD sensor 70.

The electronics pressure vessel 26 is also mounted on the support structure 20. The pressure vessel 26 comprises a water-tight, pressure resistant canister that includes a hollow can closed at each end by end caps. At least one of the end caps is removably connected to the canister to allow access to the interior of the canister.

The interior of the electronics pressure vessel 26 contains the data processing capability (hardware and software) suitable for the scanning tasks being performed by the system 16. In one example, the electronics pressure vessel 26 includes one or more data processors, one or more non-volatile storage device, and other associated components required to operate the sonar 22, the INS 24, and the CTD sensor 70, and to interface to the host platform, which optionally includes power and communication connections. For each data processor, there is preferably at least one of the non-volatile storage devices associated with the data processor.

The modular package may also contain one or more additional sonar systems of different frequencies to collect different data about the structure being inspected. For example, a low frequency sonar system having a frequency lower than the sonar system 22 can be provided. As described in U.S. Provisional Patent Application Ser. No. 61/406,479, filed on Oct. 25, 2010, and titled Remote Flooded Member Detection, the low frequency sonar system can be used to inspect the structure for flooded members. This low frequency sonar system would also be mounted on the modular support frame and would be electrically connected to the electronics pressure vessel 26.

The modular package may also contain one or more cameras and/or lights for use in collecting visual data of the structure being inspected. The cameras, if present, can be still and/or video, color and/or black and white, cameras. The lights, if present, can be flash/strobe and/or sustained lights. These cameras and lights would also be mounted on the modular support frame and electrically connected to the electronics pressure vessel. Optionally a GPS system can also be connected to the electronics pressure vessel and mounted on the modular support frame.

Figure 4:
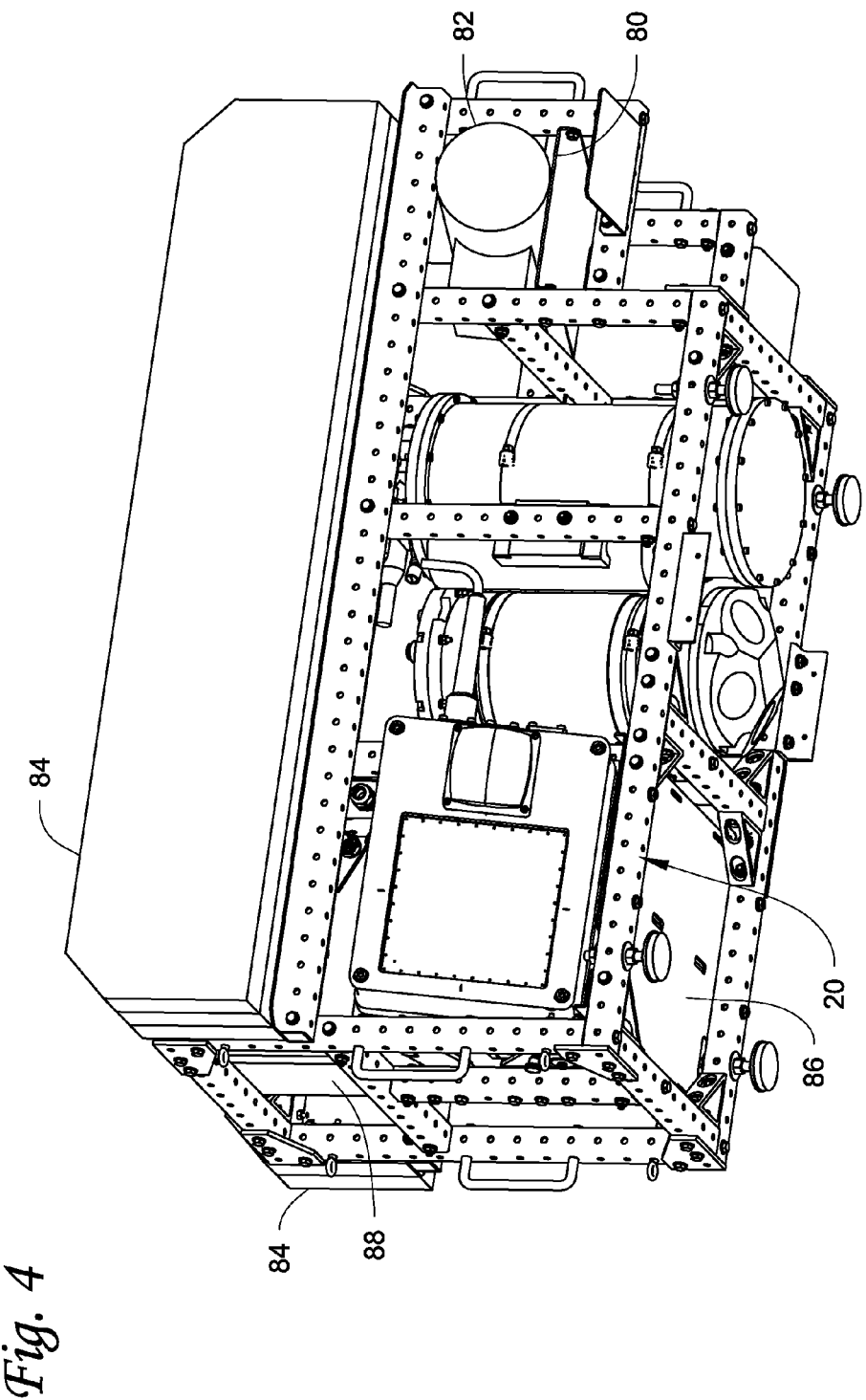
FIG. 4 illustrates a variation of the modular scanning package.

FIG. 4 illustrates a variation of the modular scanning package that includes all of the components illustrated in FIGS. 2 and 3. In addition, a camera platform 80 is mounted at the rear of the support structure 20 having a diver's video camera 82 mounted on the platform and pointed out the same side of the support structure as the 3D sonar. Blocks of flotation foam 84 or other buoyant members can be attached to the support structure to make the system neutrally buoyant. In the case of use with an AUV or an ROV, neutral buoyancy would not be required and the blocks of flotation foam need not be used. One or more rechargeable batteries 86 can provide power to the system 16, and a junction box 88 can be provided for use in linking multiple batteries together and connecting them to the electronics pressure vessel 26.

Figure 6:
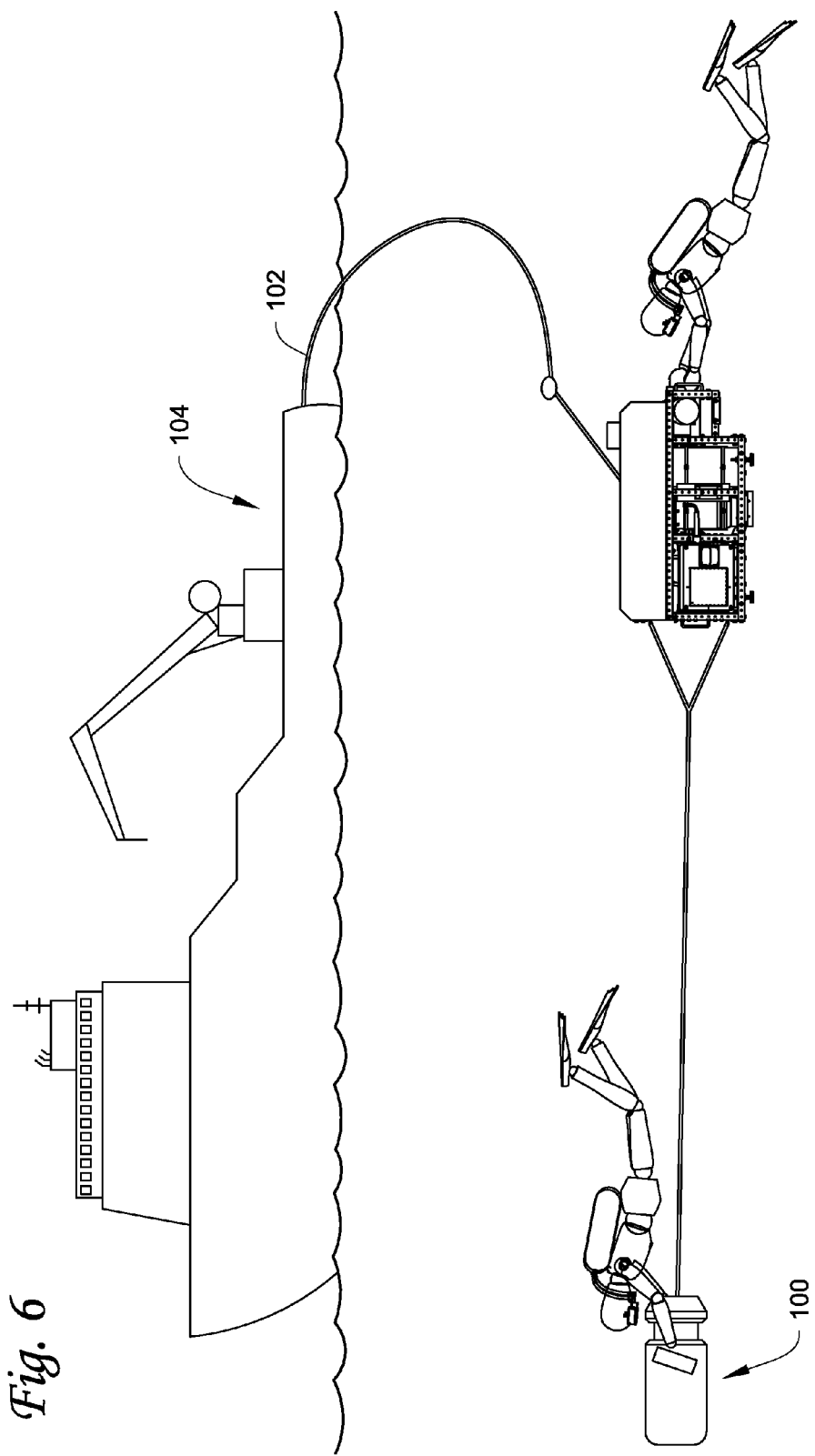
FIG. 6 illustrates a diver operated version of the modular scanning package of FIG. 4.

The embodiment of the system in FIG. 4 is especially suited for use as a diver operated version of the system as shown in FIG. 6. In this version, the system is towed by a diver operated tow vehicle 100 that is tethered to the system. A second diver can grasp handles provided at the rear of the support structure for operating the system. An umbilical 102 can extend from the system to a host platform 104, for example a surface ship, via which data and/or power (if suitable battery power is not provided on the support frame) can be transmitted between the system and the host platform. However, the system in FIG. 6 can be operated by divers with or without the umbilical 102.

Figure 5:
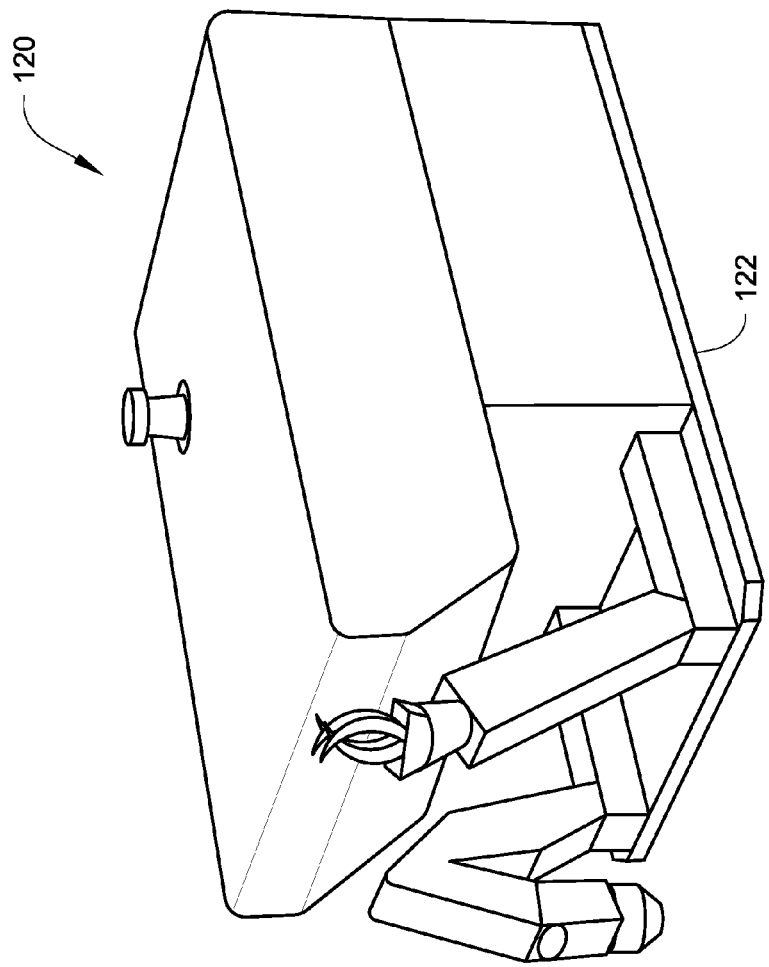
FIG. 5 illustrates an example of an ROV that can employ the modular scanning package.

FIG. 5 illustrates an example of an ROV 120 on which the system 16 can be used. The system 16 would be mounted to the bottom 122 of the ROV 120 in the manner of a tool skid, for example using the mounting holes 32.

The system described above can be used in a number of different ways for a number of different purposes. The system functions as a self-contained system for scanning an underwater structure which can be diver operated, or mounted on a host platform such as an AUV or ROV. In one embodiment, the self-contained system operates 3D sonar, collects inertial navigation data, logs and processes the data from the 3D sonar and inertial navigation system to construct a full 3D model of the scanned structure which can be used for a number of purposes including change detection and feature based navigation. The collection, logging and processing of the data to construct the 3D model would be performed using the data processing electronics in the pressure vessel. In another embodiment, the self-contained system can be used to detect changes in an underwater structure by using the pressure vessel electronics to compare the latest scans from the 3D sonar to a previous scan or to an existing 3D model of the structure. In still another embodiment, the self-contained system can be used to navigate relative to an underwater structure based on features of the underwater structure from the 3D sonar scans.

In the case of the self-contained system mounted on an ROV, the ROV pilot can use the live 3D sonar picture (which can be transmitted to a host vessel via the umbilical connected to the ROV or via other suitable transmission methods) to help navigate the ROV relative to the underwater structure. If an existing model of the structure is available, then the self-contained system can be used for feature based navigation and report to the ROV pilot the ROV's current position very accurately.

Although the data processing is performed in the pressure vessel, the collected and processed data can be extracted from the pressure vessel. For example, when the system is brought on board a host vessel, a suitable connection such as Ethernet connection between the host and the pressure vessel can be used to extract the data.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A self-contained system for scanning underwater structures, comprising:
   a support structure;
   a 3D sonar mounted on the support structure;
   an inertial navigation system mounted on the support structure;
   an electronics pressure vessel mounted on the support structure; the electronics pressure vessel including a data processor and a non-volatile storage device, and the 3D sonar and the inertial navigation system are electrically connected to the electronics pressure vessel; and
   the self-contained system does not include its own propulsion system.

2. The self-contained system of claim 1, further comprising a second sonar mounted on the support structure and electrically connected to the electronics pressure vessel, the second sonar having a different frequency than the 3D sonar.

3. The self-contained system of claim 2, further comprising a doppler velocity log mounted on the support structure and electrically connected to the electronics pressure vessel.

4. The self-contained system of claim 3, further comprising a CTD sensor, a camera, a GPS system, at least one rechargeable battery and a light, each of which is mounted on the support structure.

5. The self-contained system of claim 4, wherein the 3D sonar, the camera and the light each point in the same direction toward a side of the support structure, and the doppler velocity log points downward from the support structure.

6. The self-contained system of claim 1, wherein the electronics pressure vessel comprises a plurality of the data processors and at least one of the non-volatile storage devices for each of the data processors.

7. The self-contained system of claim 1, wherein the support structure is configured for detachable attachment to an underwater vehicle having a propulsion system.

8. The self-contained system of claim 7, wherein the underwater vehicle comprises an ROV or an AUV.

9. The self-contained system of claim 7, wherein the support structure is configured to detachably connect to a bottom of the underwater vehicle.

10. The self-contained system of claim 1, wherein there are no batteries mounted on the support structure.

11. A modular package for use in scanning underwater structures, comprising:
    a modular support frame;
    a 3D sonar mounted on the modular support frame;
    an inertial navigation system mounted on the modular support frame;
    a pressure vessel mounted on the modular support frame; the pressure vessel including a data processor and a non-volatile storage device, and the 3D sonar and the inertial navigation system are electrically connected to the pressure vessel, and
    the modular package does not include its own propulsion system.

12. The modular package of claim 11, wherein the modular support frame is configured for detachable attachment to an underwater vehicle having a propulsion system.

13. The modular package of claim 12, wherein the underwater vehicle comprises an ROV or an AUV.

14. The modular package of claim 13, wherein the modular support frame is configured to detachably connect to a bottom of the underwater vehicle.

15. The modular package of claim 11, further comprising a second sonar mounted on the modular support frame and electrically connected to the pressure vessel, the second sonar having a different frequency than the 3D sonar.

16. The modular package of claim 15, further comprising a doppler velocity log mounted on the modular support frame and electrically connected to the pressure vessel.

17. The modular package of claim 16, further comprising a CTD sensor, a camera, a GPS system, at least one rechargeable battery and a light, each of which is mounted on the modular support frame.

18. The modular package of claim 17, wherein the 3D sonar, the camera and the light each point in the same direction toward a side of the modular support frame, and the doppler velocity log points downward from the modular support frame.

19. The modular package of claim 11, wherein the pressure vessel comprises a plurality of the data processors and at least one of the non-volatile storage devices for each of the data processors.

20. The modular package of claim 11, further comprising adjustable support feet at a base end of the modular support frame.

21. The modular package of claim 11, wherein the data processor is configured to perform one or more of 3D mapping of an underwater structure, change detection of an underwater structure, or navigation relative to an underwater structure.

22. The modular package of claim 11, wherein there are no batteries mounted on the modular support frame.

23. A system, comprising:
- a host platform;
- a modular package detachably connected to the host platform, the modular package includes:
    - a modular support frame;
    - a 3D sonar mounted on the modular support frame;
    - an inertial navigation system mounted on the modular support frame;
    - a pressure vessel mounted on the modular support frame; the pressure vessel including a data processor and a non-volatile storage device, and the 3D sonar and the inertial navigation system are electrically connected to the pressure vessel, and
- the modular package is devoid of a propulsion system.

24. The system of claim 23, wherein the host platform comprises an ROV, an AUV, a ship, a diver operated tow vehicle, or a pole connected to a platform vehicle.

25. The system of claim 23, wherein there are no batteries mounted on the modular package.

* * * * *